(12) United States Patent
Marciniak et al.

(10) Patent No.: US 9,092,652 B2
(45) Date of Patent: Jul. 28, 2015

(54) ZERO REFERENCE BASED RIDGE FLOW MAP

(71) Applicant: Apple Inc., Cupertino, CA (US)

(72) Inventors: Craig A. Marciniak, San Jose, CA (US); Wayne C. Westerman, Burlingame, CA (US); Byron B. Han, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 158 days.

(21) Appl. No.: 13/831,578

(22) Filed: Mar. 15, 2013

(65) Prior Publication Data

US 2014/0003680 A1 Jan. 2, 2014

Related U.S. Application Data

(60) Provisional application No. 61/666,752, filed on Jun. 29, 2012.

(51) Int. Cl.
*G06K 9/00* (2006.01)

(52) U.S. Cl.
CPC .......... *G06K 9/00006* (2013.01); *G06K 9/0008* (2013.01)

(58) Field of Classification Search
None
See application file for complete search history.

(56) References Cited

U.S. PATENT DOCUMENTS

| | | | |
|---|---|---|---|
| 5,844,961 A | 12/1998 | McEvoy et al. | |
| 5,872,834 A | 2/1999 | Teitelbaum | |
| 5,995,630 A | 11/1999 | Borza | |
| 6,041,410 A | 3/2000 | Hsu et al. | |
| 6,181,807 B1 * | 1/2001 | Setlak et al. | 382/124 |
| 6,323,846 B1 | 11/2001 | Westerman et al. | |
| 6,518,560 B1 | 2/2003 | Yeh et al. | |
| 6,556,935 B2 | 4/2003 | Kyuragi et al. | |
| 6,570,557 B1 | 5/2003 | Westerman et al. | |
| 6,628,810 B1 | 9/2003 | Harkin | |
| 6,677,932 B1 | 1/2004 | Westerman | |
| 6,719,200 B1 | 4/2004 | Wiebe | |
| 6,766,040 B1 | 7/2004 | Catalano et al. | |
| 6,888,536 B2 | 5/2005 | Westerman et al. | |
| 6,914,517 B2 | 7/2005 | Kinsella | |
| 6,930,707 B2 | 8/2005 | Bates et al. | |
| 6,973,565 B2 | 12/2005 | Couillard | |
| 7,039,224 B2 | 5/2006 | Hamid et al. | |
| 7,043,061 B2 | 5/2006 | Hamid et al. | |
| 7,203,347 B2 | 4/2007 | Hamid et al. | |

(Continued)

OTHER PUBLICATIONS

Represent [online]. Dictionary.com, 2015 [retrieved Jan. 30, 2015]. Retrieved from the Internet: < URL: http://http://dictionary.reference.com/browse/represent?s=t >, p. 1.*

(Continued)

*Primary Examiner* — Bhavesh Mehta
*Assistant Examiner* — David F Dunphy
(74) *Attorney, Agent, or Firm* — Brownstein Hyatt Farber Schreck, LLP (57) ABSTRACT

A method includes receiving fingerprint image data at a fingerprint recognition sensor, where the fingerprint image data are associated with an authorized user. The fingerprint image data are transformed into a substantially rotationally invariant representation, which is maintained in a database of enrolled fingerprint information. Processed fingerprint image data from an accessing user are compared with the substantially rotationally invariant representation of the fingerprint image data from the authorized user.

11 Claims, 6 Drawing Sheets

(56) References Cited

U.S. PATENT DOCUMENTS

| | | |
|---|---|---|
| 7,274,807 B2 | 9/2007 | Hillhouse et al. |
| 7,327,859 B1 | 2/2008 | Chau |
| 7,356,169 B2 | 4/2008 | Hamid et al. |
| 7,385,381 B1 | 6/2008 | Mainguet |
| 7,400,749 B2 | 7/2008 | Hillhouse |
| 7,474,773 B2 | 1/2009 | Chau |
| 7,590,269 B2 | 9/2009 | Creasey et al. |
| 7,599,530 B2 | 10/2009 | Boshra |
| 7,616,786 B2 | 11/2009 | Setlak |
| 7,616,787 B2 | 11/2009 | Boshra |
| 7,688,314 B2 | 3/2010 | Abdallah et al. |
| 7,770,019 B2 | 8/2010 | Ferren et al. |
| 7,953,258 B2 | 5/2011 | Dean et al. |
| 7,990,269 B2 | 8/2011 | Bork et al. |
| 8,073,204 B2 | 12/2011 | Kramer et al. |
| 8,131,026 B2 | 3/2012 | Benkley et al. |
| 8,190,907 B2 | 5/2012 | Tu |
| 8,411,913 B2 | 4/2013 | Zhang et al. |
| 8,520,913 B2 | 8/2013 | Dean et al. |
| 8,570,293 B2 | 10/2013 | Deng |
| 8,577,091 B2 | 11/2013 | Ivanov et al. |
| 8,698,594 B2 | 4/2014 | Erhart et al. |
| 8,995,729 B2 | 3/2015 | Marques et al. |
| 2003/0129965 A1 | 7/2003 | Siegel |
| 2003/0172027 A1 | 9/2003 | Scott |
| 2006/0104483 A1 | 5/2006 | Harel et al. |
| 2006/0188132 A1 | 8/2006 | Shigeta |
| 2007/0047783 A1* | 3/2007 | Kim et al. ............ 382/124 |
| 2007/0081698 A1 | 4/2007 | Hamid et al. |
| 2008/0317306 A1 | 12/2008 | Hamilton |
| 2009/0083850 A1 | 3/2009 | Fadell et al. |
| 2009/0285459 A1* | 11/2009 | Aggarwal et al. ........ 382/125 |
| 2010/0002951 A1* | 1/2010 | Zhai et al. ............. 382/266 |
| 2011/0084711 A1 | 4/2011 | Chang et al. |
| 2011/0223888 A1 | 9/2011 | Esaki |
| 2012/0075452 A1 | 3/2012 | Ferren |
| 2013/0101186 A1* | 4/2013 | Walch et al. ........... 382/125 |
| 2013/0294660 A1 | 11/2013 | Heilpern |
| 2014/0003682 A1 | 1/2014 | Vieta et al. |
| 2014/0015774 A1 | 1/2014 | Bussat et al. |
| 2014/0219520 A1 | 8/2014 | Myers |
| 2015/0071507 A1 | 3/2015 | Setlak |

OTHER PUBLICATIONS

U.S. Appl. No. 13/842,052, filed Mar. 15, 2013, Vieta et al.
U.S. Appl. No. 13/802,609, filed Mar. 13, 2013, Bussat et al.
U.S. Appl. No. 13/757,581, filed Feb. 1, 2013, Myers.
U.S. Appl. No. 14/022,044, filed Sep. 9, 2013, Setlak.

* cited by examiner

POINCARÉ INDEX
OF LOCAL FEATURES

ZERO REFERENCE BASED RIDGE FLOW MAP

CROSS-REFERENCE TO RELATED APPLICATIONS

This application claims priority to U.S. Provisional Application No. 61/666,752, filed Jun. 29, 2012, entitled Zero Reference Based Ridge Flow Map, the entirety of which is incorporated by reference herein.

TECHNICAL FIELD

Field of the Disclosure. This application generally relates to fingerprint recognition.

BACKGROUND

Background of the Disclosure. Fingerprint recognition systems generally provide for collection of fingerprint information and comparing that information against a database of known fingerprint information.

It sometimes occurs that comparing fingerprint information is made more difficult by attempting to compare fingerprint information which is oriented at different angles. For example, if the authorized user enrolls their fingerprint information oriented at a first angle, and the accessing user attempts to use fingerprint information oriented at a second angle different from the first angle, it might be difficult to determine if the accessing user's fingerprint information is sufficiently similar to the authorized user's fingerprint information to allow access.

It sometimes occurs that comparing fingerprint information which is oriented at different angles can be accomplished, but involves substantial processing effort (alternatively, involves substantial processing effort when a difference between angles exceeds a particular threshold, such as plus or minus 45 degrees). A fingerprint information comparator can attempt to rotate the accessing user's fingerprint information and compare that rotated fingerprint information with the authorized user's fingerprint information. However, this might have the effect that the repeated operations of rotation and comparison take substantial processing effort and are time consuming. This might have the effect of adding difficulty and possible user frustration to fingerprint recognition security. This might also have the effect of making use of fingerprint recognition security a hindrance or otherwise impractical.

Each of these examples, as well as other possible considerations, can cause difficulty for the authorized user in their interaction with the fingerprint recognition system, and in their interaction with devices incorporating the fingerprint recognition system (such as a computing device using fingerprint recognition for authentication). For example, as noted above, the accessing user might find a user interface for collecting and authorizing fingerprints to be annoying or otherwise impractical, and might shy away from using that user interface. This might have the effect that the fingerprint recognition sensor remains unused, or is used less effectively than otherwise.

SUMMARY

This application provides techniques, including circuits and designs, which can receive information with respect to fingerprint images, or portions thereof, and which can be incorporated into devices using fingerprint recognition. This application also provides techniques, including devices which perform fingerprint recognition and methods which can be performed by those devices. As described herein, partial and enrolled fingerprints can be maintained in memory or storage and manipulated by a computing device, in response to and interactively with a physical contact or proximity to one or more of a user's fingerprints.

In one embodiment, techniques can include providing a fingerprint recognition sensor which processes fingerprint image data to provide a rotation-invariant set of fingerprint information, and that rotation-invariant set of fingerprint information can be used to compare fingerprint images even when those fingerprint images were collected at substantially different angles. For example, a fingerprint image collected from an authorized user at a first angle can be readily compared with a fingerprint image collected from an accessing user at a second angle different from the first angle. As described herein, rotation-invariant fingerprint information can be maintained in memory or storage and manipulated by a computing device, in response to and interactively with a physical contact or proximity to one or more of a user's fingerprints.

In one embodiment, techniques can include providing a fingerprint recognition sensor which determines a set of directions at each point in the fingerprint, identifiable in response to the fingerprint image data. For example, a direction at a point in the fingerprint can be identifiable in response to the fingerprint image data in response to a gradient of the fingerprint image data. The gradient of the fingerprint image data can be computed using a least squares determination of a best vector gradient.

In one embodiment, techniques can include providing a fingerprint recognition sensor which determines a set of first differences of directions, as those directions are computed in response to the fingerprint image data. For example, a set of directions can be computed as described above, and a set of first differences of directions can be computed with respect to directions obtained for a portion of the fingerprint image data. This can have the effect that the first differences of directions are substantially rotationally invariant with respect to the fingerprint image data.

In one embodiment, techniques can include providing a fingerprint recognition sensor which determines a landmark about which fingerprint information is substantially rotationally invariant with respect to the fingerprint image data. For example, such a landmark can include a set of Poincare index values in response to those directions, as those directions are computed in response to the fingerprint image data. For example, a Poincare index value can be computed with respect to subsets of the fingerprint image data. This can have the effect of identifying points in the fingerprint image data with known features, such as loops, whorls, and otherwise.

In one embodiment, providing a fingerprint recognition sensor which determines a histogram of directions (or of first differences of directions, or of Poincare indices), as those directions (or first differences, or Poincare indices) are computed in response to the fingerprint image data. For example, a histogram can be computed which shows relative likelihoods for each possible computed direction, from most common to least common. In such cases, a first histogram can be responsive to first set of fingerprint image data, a second histogram can be responsive to second set of fingerprint image data, and a comparison of fingerprints can be performed in response to a correlation between that first histogram and that second histogram.

While multiple embodiments are disclosed, including variations thereof, still other embodiments of the present disclosure will become apparent to those skilled in the art from the following detailed description, which shows and describes illustrative embodiments of the disclosure. As will be realized, the disclosure is capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the present disclosure, it is believed that the disclosure will be better understood from the following description taken in conjunction with the accompanying Figures, in which:

DETAILED DESCRIPTION

This disclosure is directed to systems and methods for fingerprint image processing, and a non-volatile computer-readable data storage medium on which a program for performing the method is stored, for example when executed on a computer processor. In general, the systems and methods are directed to a fingerprint sensor for receiving fingerprint image data associated with an authorized user. A processor can be used to convert these (e.g., first) fingerprint image data into a substantially rotationally invariant representation, which is stored or maintained in a database of enrolled fingerprint information. (Second) fingerprint image data from an accessing user are compared with the substantially rotationally invariant representation of the fingerprint image data from the authorized user, for example to authorize the accessing user for operation of the device.

Depending on embodiment, the substantially rotationally invariant representations of the fingerprint image data can take a variety of forms. For example, first and second sets of physical direction vectors may be utilized to characterize first and second ridge flow maps defined by the first and second fingerprint image data, respectively. Alternatively, first and second sets of logical difference values can be defined for the first and second sets of physical direction vectors, or first and second sets of Poincare index values defined for the first and second sets of physical direction vectors. The Poincare index values may also define fingerprint pattern features (e.g., tents, whorls, etc.), about which the fingerprint image data are rotationally invariant. Rotationally invariant histograms may also be defined, based on any of the data sets. It should be appreciated that embodiments described herein may be used with any suitable fingerprint sensor, including swipe or strip sensors, two-dimensional array sensors, and the like.

Fingerprint Sensor System

Figure 5:
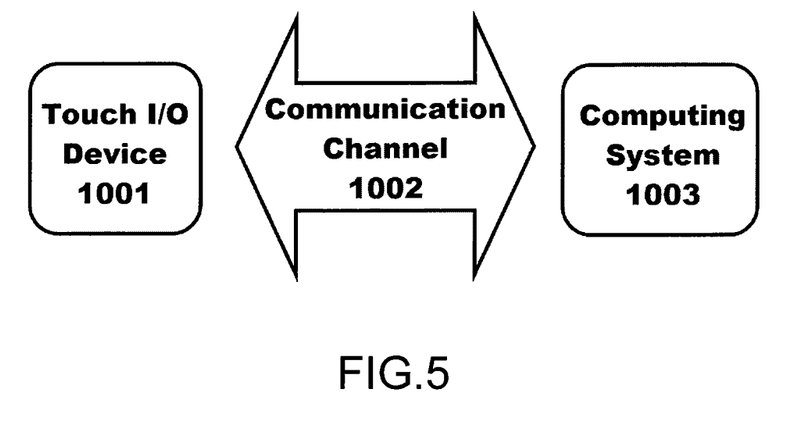
FIG. 5 shows a conceptual drawing of communication between a touch I/O device and a computing system.

FIG. 5 shows a conceptual drawing of communication between a touch I/O device and a computing system.

Figure 6:
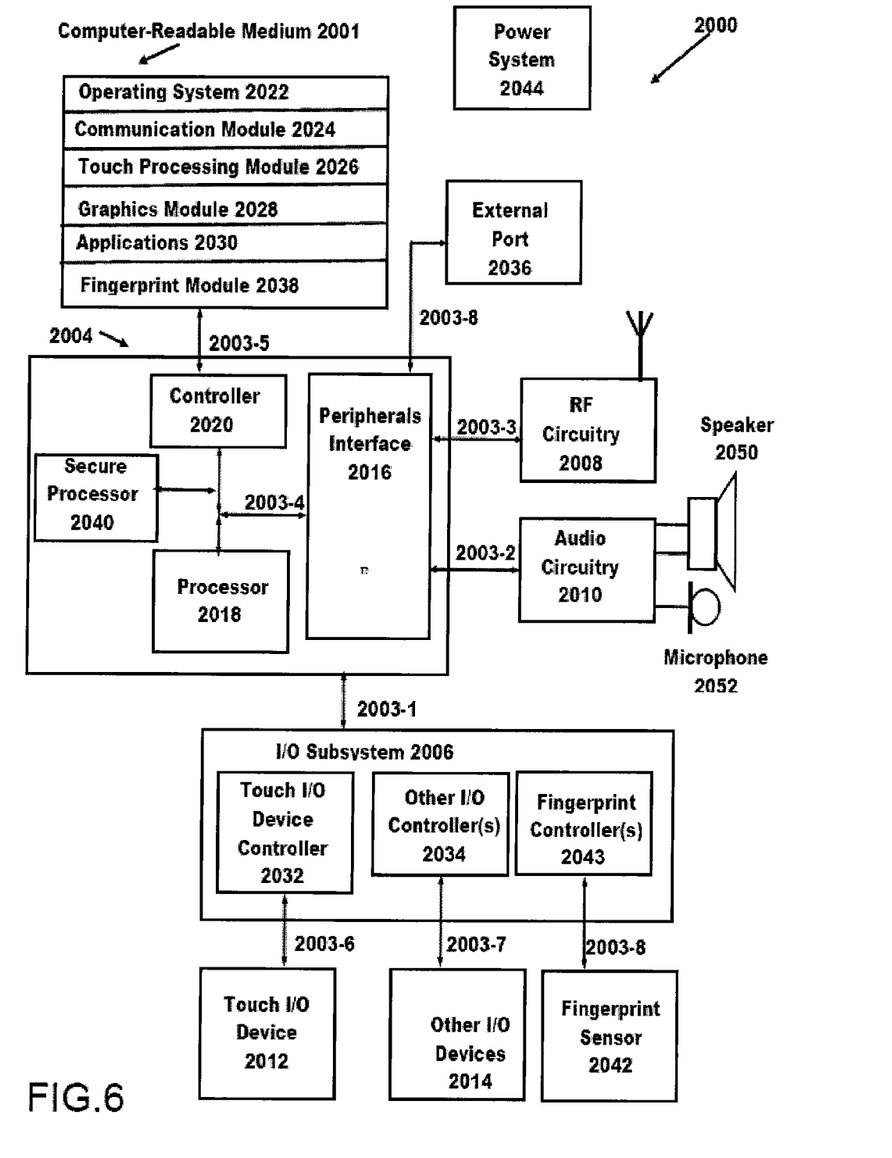
FIG. 6 shows a conceptual drawing of a system including a fingerprint recognition device.

FIG. 6 shows a conceptual drawing of a system including a fingerprint recognition device.

Described embodiments may include touch I/O device 1001 that can receive touch input for interacting with computing system 1003 via wired or wireless communication channel 1002. Touch I/O device 1001 may be used to provide user input to computing system 1003 in lieu of or in combination with other input devices such as a keyboard, mouse, etc. One or more touch I/O devices 1001 may be used for providing user input to computing system 1003. Touch I/O device 1001 may be an integral part of computing system 1003 (e.g., touch screen on a laptop) or may be separate from computing system 1003.

For example, touch I/O device 1001 can interact with a user with the user touching the touch I/O device 1001 with the user's finger (or otherwise bringing the user's finger near to the touch I/O device 1001), with the effect that the touch I/O device 1001 can receive fingerprint image data, and optionally provide feedback to the user that the fingerprint image data was received.

Touch I/O device 1001 may include a touch sensitive panel which is wholly or partially transparent, semitransparent, non-transparent, opaque or any combination thereof. Touch I/O device 1001 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensitive surface for receiving touch input.

In one example, touch I/O device 1001 embodied as a touch screen may include a transparent and/or semitransparent touch sensitive panel partially or wholly positioned over at least a portion of a display. According to this embodiment, touch I/O device 1001 functions to display graphical data transmitted from computing system 1003 (and/or another source) and also functions to receive user input. In other embodiments, touch I/O device 1001 may be embodied as an integrated touch screen where touch sensitive components/devices are integral with display components/devices. In still other embodiments a touch screen may be used as a supplemental or additional display screen for displaying supplemental or the same graphical data as a primary display and to receive touch input.

Touch I/O device 1001 may be configured to detect the location of one or more touches or near touches on device 1001 based on capacitive, resistive, optical, acoustic, inductive, mechanical, or chemical measurements, or any phenomena that can be measured with respect to the occurrences of the one or more touches or near touches in proximity to device 1001. Software, hardware, firmware or any combination thereof may be used to process the measurements of the detected touches to identify and track one or more gestures or fingerprints. A gesture or fingerprint may correspond to stationary or non-stationary, single or multiple, touches or near touches on touch I/O device 1001. A gesture or fingerprint may be performed by moving one or more fingers or other objects in a particular manner on touch I/O device 1001, such as tapping, pressing, rocking, scrubbing, twisting, changing orientation, pressing with varying pressure and the like at essentially the same time, contiguously, or consecutively. A gesture or fingerprint may be characterized by, but is not limited to, a pinching, sliding, swiping, rotating, flexing, dragging, or tapping motion between or with any other finger or fingers. A single gesture may be performed with one or more hands, by one or more users, or any combination thereof.

Computing system 1003 may drive a display with graphical data to display a graphical user interface (GUI). The GUI may be configured to receive touch input via touch I/O device 1001. Embodied as a touch screen, touch I/O device 1001 may display the GUI. Alternatively, the GUI may be displayed on a display separate from touch I/O device 1001. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 1001 which may be associated with the graphical elements of the GUI. In other embodiments, the user may perform gestures at one or more locations that are independent of the locations of graphical elements of the GUI. Gestures performed on touch I/O device 1001 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1003 (e.g., affect a state or mode of a GUI, application, or operating system). Gestures may or may not be performed on touch I/O device 1001 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other embodiments in which gestures are performed directly on a touch screen, a user may interact directly with objects on the touch screen, with or without a cursor or pointer being displayed on the touch screen.

Feedback may be provided to the user via communication channel 1002 in response to or based on the touch or near touches on touch I/O device 1001. Feedback may be transmitted optically, mechanically, electrically, olfactory, acoustically, or the like or any combination thereof and in a variable or non-variable manner. For example, feedback can include interaction with a user indicating (A) that one or more sets of fingerprint image information have been received, (B) that one or more sets of fingerprint image information have been enrolled in a database, (C) that one or more sets of fingerprint image information have been confirmed as associated with the user, or otherwise.

Attention is now directed towards embodiments of a system architecture that may be embodied within any portable or non-portable device including but not limited to a communication device (e.g. mobile phone, smart phone), a multimedia device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 2000, including combinations of two or more of these types of devices. A block diagram of one embodiment of system 2000 can generally include one or more computer-readable media 2001, processing system 2004, Input/Output (I/O) subsystem 2006, radio frequency (RF) or other electromagnetic (EMF) circuitry 2008 and audio circuitry 2010. These components may be coupled by one or more communication buses or signal lines 2003. Each such bus or signal line may be denoted in the form 2003-X, where X is a unique number. The bus or signal lines may carry data of the appropriate type between components; each bus or signal line may differ from other buses/lines, but may perform generally similar operations.

It should be apparent that the architecture shown in the figure is only one example architecture of system 2000, and that system 2000 could have more or fewer components than shown, or a different configuration of components. The various components shown in the figure can be implemented in hardware, software, firmware or any combination thereof, including one or more signal processing and/or application specific integrated circuits.

RF circuitry 2008 is used to send and receive information over a wireless link or network to one or more other devices and includes circuitry for performing this function. RF circuitry 2008 and audio circuitry 2010 are coupled to processing system 2004 via peripherals interface 2016. Interface 2016 includes various components for establishing and maintaining communication between peripherals and processing system 2004. Audio circuitry 2010 is coupled to audio speaker 2050 and microphone 2052 and includes circuitry for processing voice signals received from interface 2016 to enable a user to communicate in real-time with other users. In some embodiments, audio circuitry 2010 includes a headphone jack (not shown).

Peripherals interface 2016 couples the input and output peripherals of the system to processor 2018 and computer-readable medium 2001. One or more processors 2018 communicate with one or more computer-readable media 2001 via controller 2020. Computer-readable medium 2001 can be any device or medium that can store code and/or data for use by one or more processors 2018. Medium 2001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 2001 may also include a transmission medium for carrying information-bearing signals indicative of computer instructions or data (with or without a carrier wave upon which the signals are modulated, or any other form of signal modification). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 2018 can execute, run or interpret various software components stored in medium 2001 to perform various functions for system 2000. In some embodiments, the software components include operating system 2022, communication module (or set of instructions) 2024, touch processing module (or set of instructions) 2026, graphics module (or set of instructions) 2028, one or more applications (or set of instructions) 2030, and fingerprint sensing module (or set of instructions) 2038. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, medium 2001 may store a subset of the modules and data structures identified above. Furthermore, medium 2001 may store additional modules and data structures not described above.

Operating system 2022 includes various procedures, sets of instructions, software components and/or drivers for controlling and managing general system tasks (e.g., memory management, storage device control, power management, etc.), and facilitates communication between various hardware and software components.

Communication module 2024 facilitates communication with other devices over one or more external ports 2036 or via RF circuitry 2008 and includes various software components for handling data received from RF circuitry 2008 and/or external port(s) 2036.

Graphics module 2028 includes various known software components for rendering, animating and displaying graphical objects on a display surface. In embodiments in which touch I/O device 2012 is a touch sensitive display (e.g., touch screen), graphics module 2028 can include components for rendering, displaying, and animating objects on the touch sensitive display.

One or more applications 2030 can include any applications installed on system 2000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS) or other positioning systems), a music player, etc.

Touch processing module 2026 includes various software components for performing various tasks associated with touch I/O device 2012, including but not limited to receiving and processing touch input received from I/O device 2012 via touch I/O device controller 2032.

System 2000 may further include fingerprint sensing module 2038 for performing the method/functions as described herein in connection with FIGS. 1-4. Fingerprint sensing module 2038 may at least be executed to, or otherwise function to, perform various tasks associated with the fingerprint sensor, such as receiving and processing fingerprint sensor input. The fingerprint sensing module 2038 may also control certain operational aspects of the fingerprint sensor 2042, such as its capture of fingerprint data and/or transmission of the same to the processor 2018 and/or secure processor 2040. Module 2038 may also interact with the touch I/O device 2012, graphics module 2028 or other graphical display. Module 2038 may be embodied as hardware, software, firmware, or any combination thereof. Although module 2038 is shown to reside within medium 2001, all or portions of module 2038 may be embodied within other components within system 2000 or may be wholly embodied as a separate component within system 2000.

I/O subsystem 2006 is coupled to touch I/O device 2012 and one or more other I/O devices 2014 for controlling or performing various functions. Touch I/O device 2012 communicates with processing system 2004 via touch I/O device controller 2032, which includes various components for processing user touch input (e.g., scanning hardware). One or more other input controllers 2034 receive/send electrical signals from/to other I/O devices 2014. Other I/O devices 2014 may include physical buttons, dials, slider switches, sticks, keyboards, touch pads, additional display screens, or any combination thereof.

If embodied as a touch screen, touch I/O device 2012 displays visual output to the user in a GUI. The visual output may include text, graphics, video, and any combination thereof. Some or all of the visual output may correspond to user-interface objects. Touch I/O device 2012 forms a touch-sensitive surface that accepts touch input from the user. Touch I/O device 2012 and touch screen controller 2032 (along with any associated modules and/or sets of instructions in medium 2001) detect and track touches or near touches (and any movement or release of the touch) on touch I/O device 2012 and convert the detected touch input into interaction with graphical objects, such as one or more user interface objects. In the case in which device 2012 is embodied as a touch screen, the user can directly interact with graphical objects that are displayed on the touch screen. Alternatively, in the case in which device 2012 is embodied as a touch device other than a touch screen (e.g., a touch pad), the user may indirectly interact with graphical objects that are displayed on a separate display screen embodied as I/O device 2014.

Touch I/O device 2012 may include technologies analogous to the multi-touch sensitive surfaces described in the following U.S. Pat. No.: 6,323,846 (Westerman et al.), U.S. Pat. No. 6,570,557 (Westerman et al.), and/or U.S. Pat. No. 6,677,932 (Westerman); and/or U.S. Patent Publication 2002/0015024A1, each of which is hereby incorporated by reference.

In embodiments in which touch I/O device 2012 is a touch screen, the touch screen may use LCD (liquid crystal display) technology, LPD (light emitting polymer display) technology, OLED (organic LED), or OEL (organic electro luminescence), although other display technologies may be used in other embodiments.

Feedback may be provided by touch I/O device 2012 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactorily, acoustically (e.g., beep), or the like, or any combination thereof, and in a variable or non-variable manner.

System 2000 also includes power system 2044 for powering the various hardware components and may include a power management system, one or more power sources, a recharging system, a power failure detection circuit, a power converter or inverter, a power status indicator and any other components typically associated with the generation, management and distribution of power in portable devices.

In some embodiments, peripherals interface 2016, one or more processors 2018, and memory controller 2020 may be implemented on a single chip, such as processing system 2004. In some other embodiments, they may be implemented on separate chips.

In addition to the foregoing, the system 2000 may include a secure processor 2040 in communication with a fingerprint sensor 2042, via a fingerprint I/O controller 2043. Secure processor 2040 may be implemented as one or more processing units, as may processor 2018, controller 2020, and the like. The operation of these various elements will now be described.

The fingerprint sensor 2042 may operate to capacitively capture a series of images, or nodes. When taken together, these nodes may form a set of fingerprint image information. A collection of nodes may be referred to herein as a "mesh," "mosaic," "template," or other indicator of fingerprint information.

Each node of fingerprint information may be separately captured by the fingerprint sensor 2042, which may be an array sensor. Generally, there can be some overlap between images in nodes representing adjacent or nearby portions of a fingerprint. Such overlap may assist in assembling the fingerprint from the nodes, as various image recognition techniques may be employed to use the overlap to properly identify and/or align adjacent nodes in the fingerprint information.

Sensed fingerprint data may be transmitted through the fingerprint I/O controller 2043 to the processor 2018 and/or the secure processor 2040. In some embodiments, the data is relayed from the fingerprint I/O controller 2043 to the secure processor 2040 directly. The fingerprint data is encrypted, obfuscated, or otherwise prevented from being accessed by an unauthorized device or element, by any of the fingerprint sensor 2042, the fingerprint I/O controller 2043 or another element prior to being transmitted to either processor. The secure processor 2040 may decrypt the data to reconstruct the node. In some embodiments, unencrypted data may be transmitted directly to the secure processor 2040 from the fingerprint controller 2043 (or the sensor 2042 if no controller is present). The secure processor may then encrypt this data.

Fingerprint data, either as individual nodes, collections of nodes, or substantially complete fingerprint templates, may be stored in the computer-readable medium 2001 and accessed as necessary. In some embodiments, only the secure processor 2040 may access stored fingerprint data, while in other embodiments either the secure processor or the processor 2018 may access such data.

Directional Vectors

Figure 1:
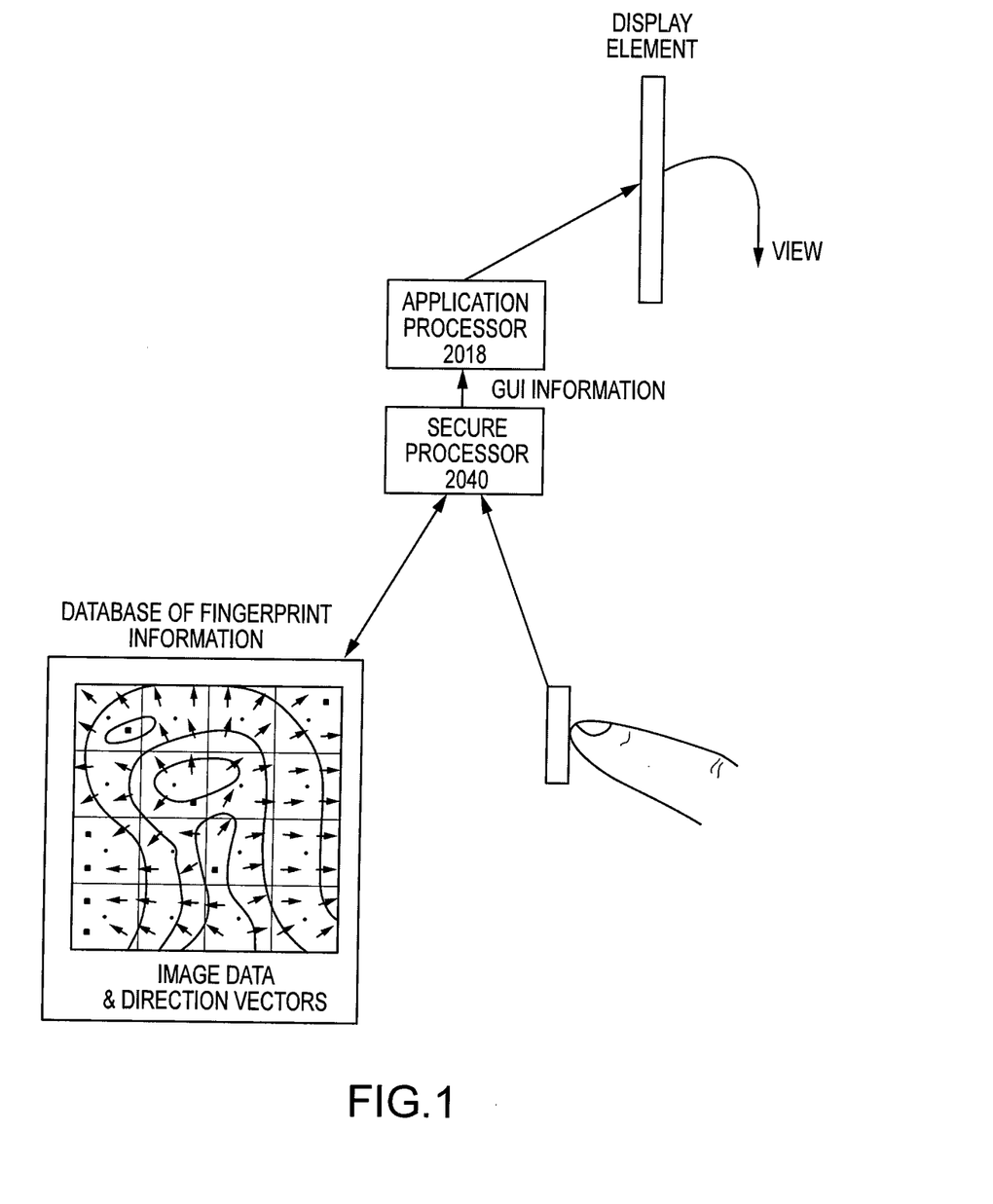
FIG. 1 shows a conceptual drawing of a fingerprint image, a set of defined ridges, and a set of directional vectors.

FIG. 1 shows a conceptual drawing of a fingerprint image, a set of defined ridges, and a set of directional vectors.

A device includes a fingerprint recognition sensor, capable of receiving fingerprint image data, such as from a fingerprint image sensor (optionally included or incorporated into the touch I/O device 2012 described herein), and including one or more processing units (such as the processor 2018 and the secure processor 2040 described herein) capable of processing that fingerprint image data to determine a set of directional vectors. The device can include, or have access to, memory or storage in which it can maintain and manipulate fingerprint information, such as one or more databases of fingerprint information which can be used to manipulate and compare fingerprint information, as described herein.

In one embodiment, each database of fingerprint information can include a set of fingerprint image data. "Fingerprint image data" may include, for example, data relating to a ridge, valley or other feature of a fingerprint. For example, each set of fingerprint image data can include an 88×88 block of fingerprint image data received from a fingerprint image sensor, and maintained in memory or storage included with or accessible to a processing unit. Each database of fingerprint information can include a set of directional vectors, determined from, and/or generated by, a processing unit analyzing the fingerprint image data, and similarly maintained in memory or storage included with or accessible to the processing unit.

Accordingly, FIG. 1 shows a conceptual drawing of a set of fingerprint image data, such as can be received and processed as described above, and a set of directional vectors, such as can be received and processed in response to the fingerprint image data.

In one embodiment, each directional vector can be responsive to a 4×4 block of fingerprint image data, determined in response to a least squares computation on two values each for a delta in a horizontal direction (delta X) and two values each for a delta in a vertical direction (delta Y). This has the effect that a 4N×4N block of fingerprint image data is transformed into a block of N×N directional vectors. For example, in a case in which a fingerprint image includes an 88×88 block of fingerprint image data, determining a set of directional vectors could transform that fingerprint image into fingerprint information including a 22×22 block of directional vectors.

For example, each 4×4 block of fingerprint image data can be used by a processing unit to define a direction vector, where the direction vector is shown as an arrow (or a block, where the direction vector has no substantial magnitude) in the figure. After reading this application, those skilled in the art would recognize that determination of direction vectors is responsive to, and transformative of, real-world data such as fingerprint image data received from a user's fingerprint, and provides a useful and tangible result in the service of enrolling and comparing fingerprints in a biometric security context. Moreover, after reading this application, those skilled in the art would recognize that processing of fingerprint data by a computing device includes substantial computer control and programming, involves substantial records of fingerprint information, and involves interaction with fingerprint sensing hardware and optionally a user interface for fingerprint enrollment and authentication.

In one embodiment, each directional vector can be responsive to a ridge flow map determined in response to the fingerprint image data. For example, a ridge flow map can be determined using methods for edge detection, such as for example a Sobel transform, a Scharr transform, or a Hough transform, each of which can be applied to detect edges in the fingerprint image data, with the effect that a ridge flow map can be constructed, and a gradient can be determined in response to that ridge flow map. The fingerprint recognition sensor can use a Sobel transform to obtain edge information, such as ridges of the fingerprint. Similarly, the fingerprint recognition sensor can use a Scharr transform to obtain edge information, such as ridges of the fingerprint, generally with less error from computing the transform. Similarly, the fingerprint recognition sensor can use a Hough transform to obtain edge information, such as ridges of the fingerprint. Having obtained ridges of the fingerprint, the fingerprint recognition sensor can determine a set of gradient values in response to the ridge flow map.

Differences of Directions

Figure 2:
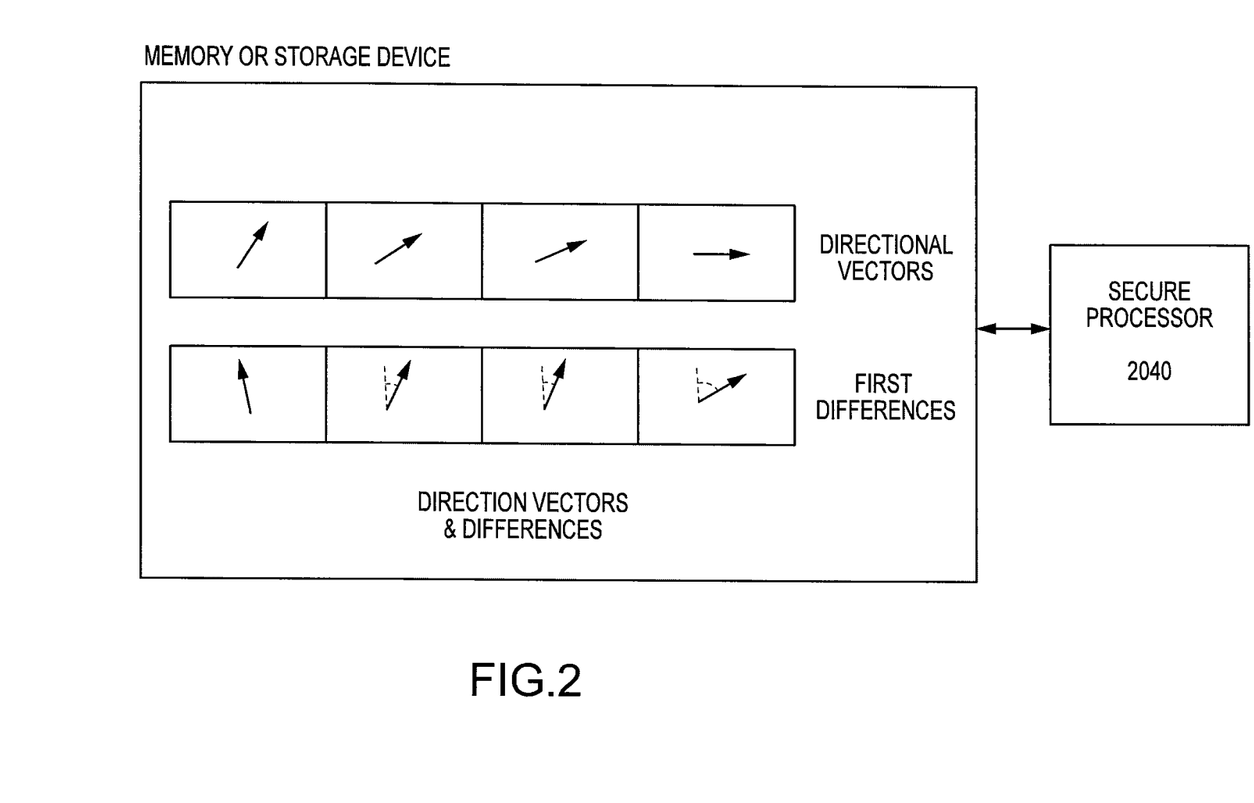
FIG. 2 shows a conceptual drawing of a set of first differences of directional vectors.

FIG. 2 shows a conceptual drawing of a set of first differences of directional vectors.

In one embodiment, the fingerprint recognition sensor can further process a portion of the processed fingerprint image data, so as to determine a set of first differences of directional vectors. As described herein, processed fingerprint image data can be maintained in memory or storage and manipulated by a computing device, in response to and interactively with a physical contact or proximity to one or more of a user's fingerprints.

For example, the fingerprint recognition sensor can determine, for each row of the processed fingerprint image data, a set of differences of the direction vectors from a left-most direction vector of that row. This has the effect that the row information of differences of the direction vectors is substantially invariant with respect to rotation of the fingerprint image. In such cases in which the fingerprint image is rotated, the direction vectors will each be rotated by an identical amount (at the least, a substantially similar amount), with the effect that the differences in of the direction vectors will not change.

In one example, if the fingerprint image data is rotated by some angle, such as 90 degrees, each of the calculated direction vectors will each also be rotated by that same angle, such as 90 degrees. This will have the effect that each reference direction vector, such as a left-most direction vector of each row of direction vectors, will also be rotated by that same angle, such as 90 degrees. However, each of the other direction vectors will be rotated by the same amount, such as 90 degrees, and the differences between each other direction vector and the reference direction vector will be unchanged (since the same amount of rotation is being applied to both, their difference will remain unchanged).

In one embodiment, the direction vectors as computed with respect to the fingerprint data are sometimes referred to herein as "physical" direction vectors, while the differences of the direction vectors are sometimes referred to herein as "logical" direction vectors. Physical direction vectors are responsive to rotation of the fingerprint image data, while logical direction vectors are substantially invariant with respect to rotation of the fingerprint image data.

In alternative embodiments, the fingerprint recognition sensor can further process a different portion of the processed fingerprint image data, such as a 4×4 block of direction vectors (possibly corresponding to a 16×16 block of fingerprint image data), similarly computing a set of differences of the direction vectors, such as with respect to an upper-left corner of that block. Alternatively, the fingerprint recognition sensor can further process a portion of the processed fingerprint image data, so as to determine a second difference, or some other value derived from the direction vectors which can be made substantially rotationally invariant.

Figure 3:
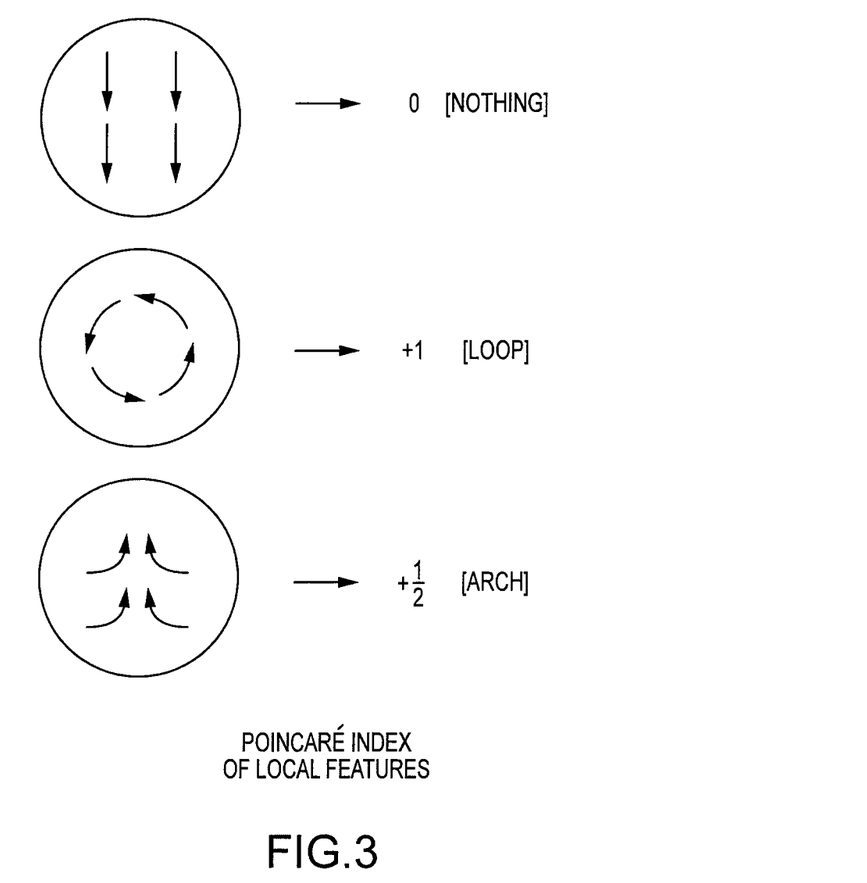
FIG. 3 shows a conceptual drawing of a Poincare index of a set of directional vectors.

In one embodiment, the fingerprint recognition sensor can provide a set of fingerprint information which is substantially rotationally invariant with respect to a particular anchor point. For example, as described below, the fingerprint recognition sensor can provide fingerprint information which is substantially rotationally invariant with respect to a singular point of a locally-computed Poincare index.

Poincare Index Values

FIG. 3 shows a conceptual drawing of a Poincare index of a set of directional vectors.

In one embodiment, the fingerprint recognition sensor can further process a portion of the processed fingerprint image data, so as to determine an anchor point with respect to the directional vectors. For example, the fingerprint recognition sensor can compute a Poincare index value about each of a set of selected points.

In one example, the Poincare index of a curve in a vector field is computed as the line integral of the vector field over the curve. In the case of direction vectors derived from fingerprint image data, a Poincare index can be determined for a 4×4 block of direction vectors by summing the direction vectors at the edge of the block. Similarly, a Poincare index can be determined for a larger block of direction vectors in response to the direction vectors in that block.

In one embodiment, the fingerprint recognition sensor can use a Poincare index to determine an anchor point in the fingerprint image. For a first example, in a section of the fingerprint image in which ridge flows both enter and exit the section equally, the Poincare index of that block should be computed as substantially equal to zero. For a second example, in a section of the fingerprint image in which ridge flows wind around a central point (such as a loop or a whorl), the Poincare index of that block should be computed as substantially equal to one. In these two examples, the Poincare index is similar to a computation of winding number. For a third example, in a section of the fingerprint image in which the fingerprint ridge flow forms a "tent" assembly, the Poincare index of that block should be computed as a middle value, such as substantially equal to one-half.

In one embodiment, when, for a block of direction vectors, the Poincare index differs substantially from neighbor blocks, the fingerprint recognition sensor can detect that there is an anchor point in the fingerprint image. In such cases, the fingerprint recognition sensor can use the anchor point to generate a set of fingerprint information that is substantially rotationally invariant about that anchor point.

Histogram Method

Figure 4:
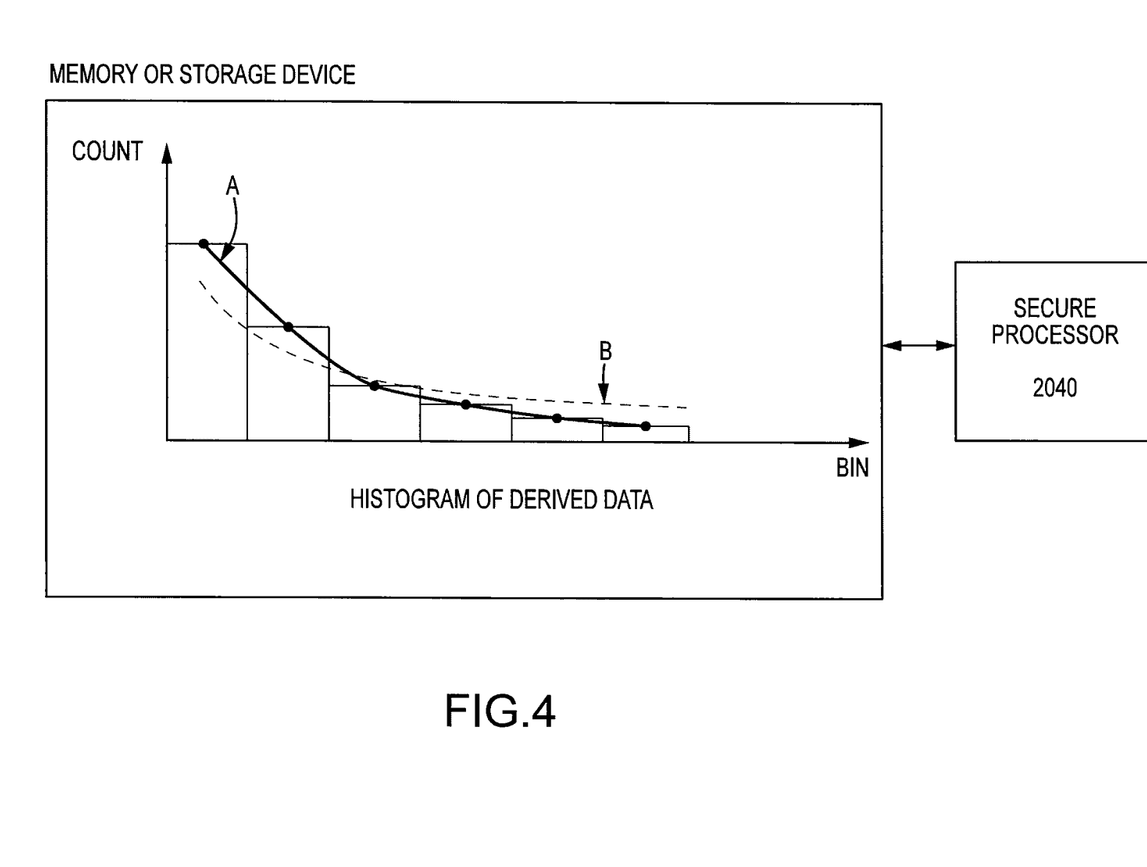
FIG. 4 shows a conceptual drawing of a histogram of derived information from a fingerprint image.

FIG. 4 shows a conceptual drawing of a histogram of derived information from a fingerprint image.

In one embodiment, the fingerprint recognition sensor can construct a histogram of information derived from a fingerprint image. As described herein, the histogram of information derived from a fingerprint image can be maintained in memory or storage and manipulated by a computing device, in response to and interactively with a physical contact or proximity to one or more of a user's fingerprints.

In one embodiment, the histogram includes a set of bins, each of which includes a count of a number of values which match that bin. For example, each bin can represent a range of logical direction vectors (such as a first bin between 0 degrees and 10 degrees from the horizontal axis, a second bin between 10 degrees and 20 degrees from the horizontal axis, and so on). In such cases, the fingerprint recognition sensor uses logical direction vectors (that is, differences of physical direction vectors), which are substantially rotationally invariant, rather than physical direction vectors, which can change with orientation of the fingerprint image data.

In alternative embodiments, the fingerprint recognition sensor can construct a histogram of any information which is substantially rotationally invariant. Examples include a histogram of logical direction vectors (that is, differences of direction vectors from a reference direction vector), direction vectors relative to an anchor point, Poincare index values relative to an anchor point (such as a set of relative angles of those Poincare index values which are not equal to zero), and otherwise.

In one embodiment, the fingerprint recognition sensor can sort the histogram with respect to fullness of each bin, with the effect of generating a histogram which has a particular shape. For example, fingerprint recognition sensor can use sorting to ensure that the histogram has a monotonically decreasing slope. In alternative embodiments, the fingerprint recognition sensor need not sort the histogram, and can leave the histogram to have the shape it acquires when the bin locations are maintained in their original order.

In one embodiment, the fingerprint recognition sensor can compare a first histogram, such as one associated with an authorized user or an enrolled fingerprint, with a second histogram, such as one associated with an accessing user or a new fingerprint. When the first histogram is sufficiently similar to the second histogram, the fingerprint recognition sensor can determine that there is a match, with the effect that matching fingerprints would be substantially invariant with respect to what angle at which each fingerprint was captured.

In one embodiment, the fingerprint recognition sensor compares histograms by determining a difference between the bin fullness for each bin. For a first example, the fingerprint recognition sensor can attempt to compute a correlation or covariance value for a pair of histograms, and to declare that the pair of histograms are sufficiently equivalent when the correlation exceeds a selected threshold value, such as no less than a 90% correlation value. For a second example, the fingerprint recognition sensor can attempt to sum the difference of bin fullness values (or sum the squares of those differences), and to declare that the pair of histograms are sufficiently equivalent when the sum of differences is less than a selected threshold value, such as no more than 10% of the total bin fullness.

Certain aspects of the embodiments described in the present disclosure may be provided as a computer program product, or software, that may include, for example, a computer-readable storage medium or a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular examples. Functionality may be separated or combined in procedures differently in various embodiments of the disclosure or described with different terminology. These and other variations, modifications, additions, and improvements may fall within the scope of the disclosure as defined in the claims that follow.

We claim:

1. A method comprising:
receiving fingerprint image data associated with an authorized user by a fingerprint recognition sensor;
transforming the fingerprint image data associated with the authorized user into a substantially rotationally invariant representation thereof, wherein transforming the fingerprint image data associated with the authorized user comprises determining a set of directions based on gradients defined at different points in the fingerprint image data, and determining a set of differences of the directions;
maintaining the substantially rotationally invariant representation of the fingerprint image data associated with the authorized user in a database of enrolled fingerprint information; and
comparing processed fingerprint image data from an accessing user with the substantially rotationally invariant representation of the fingerprint image data from the authorized user by comparing a first histogram for the set of differences based on the fingerprint image data associated with the authorized user and a second histogram for a corresponding set of differences based on the fingerprint image data from the accessing user.

2. The method of claim 1, wherein comparing the processed fingerprint image data is performed in response to the accessing user attempting to match fingerprints with the authorized user.

3. The method of claim 2, further comprising authorizing the accessing user based on a match between the substantially rotationally invariant representation of the fingerprint image data from the authorized user and the processed fingerprint image data from the accessing user, wherein the fingerprint image data associated with the authorized user and the processed fingerprint image data from the accessing user are obtained at substantially different angular orientations with respect to the fingerprint recognition sensor.

4. The method of claim 1, further comprising determining a landmark in the fingerprint image data associated with the authorized user, wherein the set of differences is substantially rotationally invariant about the landmark.

5. The method of claim 4, wherein the landmark is based on a set of Poincare index values determined from the set of directions, and wherein the Poincare index values are indicative of a feature of the fingerprint image data associated with the authorized user.

6. The method of claim 5, wherein comparing a first histogram for the set of differences based on the fingerprint image data associated with the authorized user comprises comparing a first histogram for the set of Poincare index values based on the fingerprint image data associated with the authorized user, and wherein comparing a second histogram for a corresponding set of differences based on the fingerprint image data from the accessing user comprises comparing a second histogram for a corresponding set of Poincare index values based on the fingerprint image data from the accessing user.

7. A fingerprint image processing system comprising:
a fingerprint sensor configured for receiving first fingerprint image data of an authorized user and second fingerprint image data of an accessing user, wherein the first and second fingerprint image data are oriented at substantially different angles with respect to the fingerprint sensor;
a database configured for storing a substantially rotationally invariant representation of the first fingerprint image data of the authorized user, wherein the rotationally invariant representation of the first fingerprint image data comprises a set of determined directions based on gradients defined at different points in the first fingerprint image data and a set of determined differences of the directions; and
a processor configured for authorizing the accessing user based on comparing the substantially rotationally invariant representation of the first fingerprint image data of the authorized user with a substantially rotationally invariant representation of the second fingerprint image data of the accessing user by comparing a first histogram for the set of differences based on the first fingerprint image data associated with the authorized user and a second histogram for a corresponding set of differences based on the fingerprint image data from the accessing user.

8. The fingerprint image processing system of claim 7, wherein the processor is configured to determine a landmark in the fingerprint image data associated with the authorized user, wherein the set of differences is substantially rotationally invariant about the landmark.

9. The fingerprint image processing system of claim 8, wherein the landmark is based on a set of Poincare index values determined from the set of directions, and wherein the Poincare index values are indicative of a feature of the fingerprint image data associated with the authorized user.

10. The fingerprint image processing system of claim 9, wherein the first histogram comprises a first histogram for the set of Poincare index values based on the fingerprint image data associated with the authorized user and the second histogram comprises a second histogram for a corresponding set of Poincare index values based on the fingerprint image data from the accessing user.

11. A non-volatile computer readable data storage medium having program data stored thereon, the program data executable by a computer processor to perform a method comprising:

receiving first fingerprint image data from an authorized user, the first fingerprint image data oriented at a first angle with respect to a fingerprint image sensor;

transforming the first fingerprint image data from the authorized user into a substantially rotationally invariant representation thereof;

storing the substantially rotationally invariant representation of the first fingerprint image data from the authorized user in a database;

receiving second fingerprint image data from an accessing user, the second fingerprint image data oriented at a second angle with respect to the fingerprint image sensor, where the second angle is different from the first angle;

transforming the second fingerprint image data from the accessing user into a substantially rotationally invariant representation thereof, wherein the substantially rotationally invariant transformations of the first and second fingerprint image data comprise first and second sets of Poincare index values determined from a set of directions that are based on gradients defined at different points in the first and second fingerprint image data;

comparing the substantially rotationally invariant transformations of the first and second fingerprint image data to determine a match by comparing a first histogram for the first set of Poincare index values and a second histogram for the second set of Poincare index values; and authorizing the accessing user, based on the match.

* * * * *